United States Patent

Davis

[15] 3,638,920
[45] Feb. 1, 1972

[54] MATERIAL-MIXING APPARATUS

[72] Inventor: Ramsey H. Davis, 626 N. Nettleton, Bonner Springs, Kans. 66012

[22] Filed: Nov. 27, 1970

[21] Appl. No.: 93,243

[52] U.S. Cl. .................................259/104, 259/5, 259/21
[51] Int. Cl. ............................................................B01f 7/04
[58] Field of Search..............................259/6, 104, 21, 41, 5

[56] References Cited

UNITED STATES PATENTS

| | | | |
|---|---|---|---|
| 2,947,524 | 8/1960 | Bridges | 259/104 |
| 3,090,605 | 5/1963 | Copeland | 259/104 |
| 3,421,740 | 1/1969 | Behrens | 259/6 X |

*Primary Examiner*—Robert W. Jenkins
*Attorney*—Fishburn, Gold and Litman

[57] ABSTRACT

A material-mixing apparatus for mixing feeding ration includes an agitator rotatably mounted in a mixing chamber and adapted to operate submerged beneath a mass of materials to be mixed and having a first plurality of upwardly and forwardly directed paddles and a second plurality of downwardly and rearwardly directed paddles and a screw conveyor adjacent each of opposed sidewalls of the mixing chamber with the screw conveyors being positioned at a higher level than the agitator and having edge portions of a flight thereof below an upper surface of the mass of materials. The agitator and the screw conveyors are rotated at different speeds to thoroughly blend the mass of materials within the mixing chamber.

11 Claims, 8 Drawing Figures

INVENTOR.
Romsey H. Davis
BY
Fishburn, Gold & Litman
ATTORNEYS

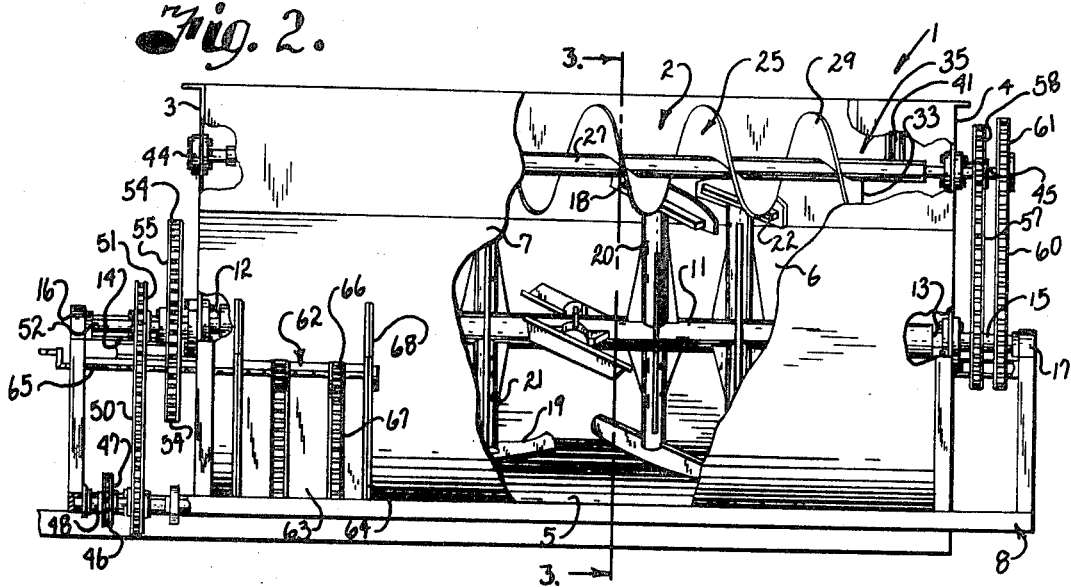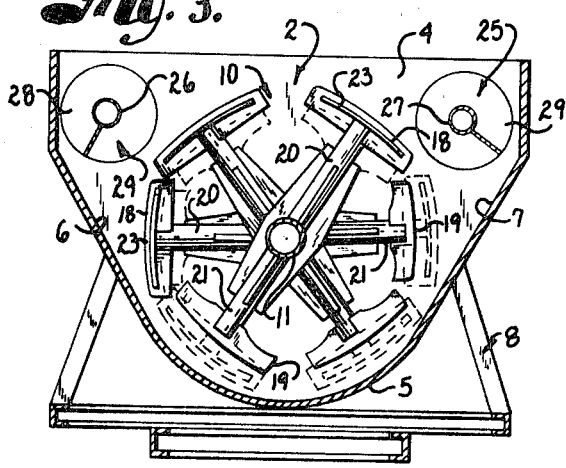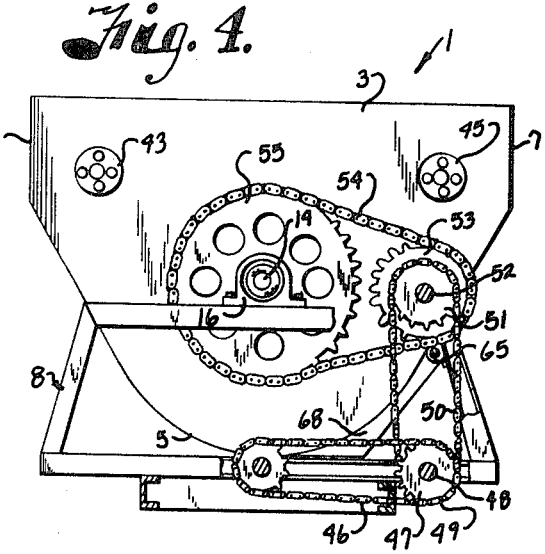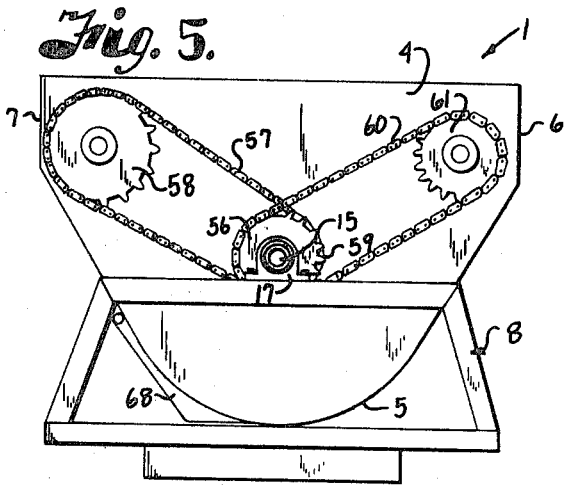

MATERIAL-MIXING APPARATUS

The present invention relates to material-mixing apparatus and more particularly to a material-mixing apparatus having an agitator in a lower portion of a mixing chamber and a pair of spaced screw conveyors in an upper portion of the mixing chamber for moving surface materials toward the agitator.

The principal objects of the present invention are: to provide a material-mixing apparatus particularly adapted for precision mixing of a plurality of materials having different physical characteristics, such as weight, size, viscosity, cohesiveness and the like; to provide such a material-mixing apparatus operative to collect, mix and deliver a thoroughly mixed high quality end product, such as a feeding ration for farm animals, including cattle and the like; to provide such a material-mixing apparatus which is extremely flexible and versatile in mixing various materials conforming to prospective needs and mixing the materials to conform to a chemical analysis having the proportions of various materials within narrow ranges; to provide such a material-mixing apparatus adapted to mix silage, haylage, oatlage, hulls, molasses, high-moisture grain or dry grain, liquid molasses, vitamins, concentrates, medications, minerals and the like to form a desired feeding ration; to provide such a material-mixing apparatus having an agitator for constantly moving roughages, such as silage, haylage, oatlage and the like from one end of a mixing chamber to the other and constantly raising and lowering same thereby blending said roughages with grain, liquid molasses, supplements, concentrates, vitamins, minerals and the like with the mixing being accomplished throughout the entire mixing chamber and a pair of augers or screw conveyors positioned above and on each side of the agitator to circulate or move the materials within the mixing chamber from one end toward the other thereby constantly blending the materials with feedstuffs being circulated by the agitator wherein the augers or screw conveyors break up bulky roughages by scouring the agitator's paddles and creating faster circulation thereby substantially reducing the required mixing time over prior material-mixing apparatus; to provide such a material-mixing apparatus wherein the agitator is particularly adapted to raise heavy resistant ingredients from a bottom portion of the mixing chamber to insure uniformly blended materials; to provide such a material-mixing apparatus having a pair of spaced augers or screw conveyors positioned above and having an agitator therebetween to circulate feedstuffs between opposite ends of the mixing chamber and deliver same to the agitator; to provide such a material-mixing apparatus having a mixing chamber and an agitator and a pair of augers or screw conveyors therein with the mixing chamber and agitator and screw conveyors cooperating to constantly circulate the materials to be mixed throughout the entire mixing chamber thereby substantially eliminating dead spots which impair accuracy in proportioning the materials in the final mix; and to provide such a material-mixing apparatus which is positive in operation, durable in construction, and particularly well adapted for the proposed use.

Other objects and advantages of this invention will become apparent from the following description taken in connection with the accompanying drawings wherein are set forth by way of illustration and example, certain embodiments of this invention.

FIG. 2 is a side elevational view of the material-mixing apparatus with portions broken away to better illustrate the mixing members within the material-mixing apparatus.

FIG. 3 is a transverse sectional view taken on line 3—3, FIG. 2, showing the shape of the mixing chamber and the relative positions of an agitator and a pair of augers or screw conveyors.

FIG. 4 is a front end elevational view of the material-mixing apparatus showing driving means for rotating the agitator.

FIG. 5 is a rear end elevational view of the material-mixing apparatus showing driving members for rotating the pair of augers or screw conveyors.

Figure 1:
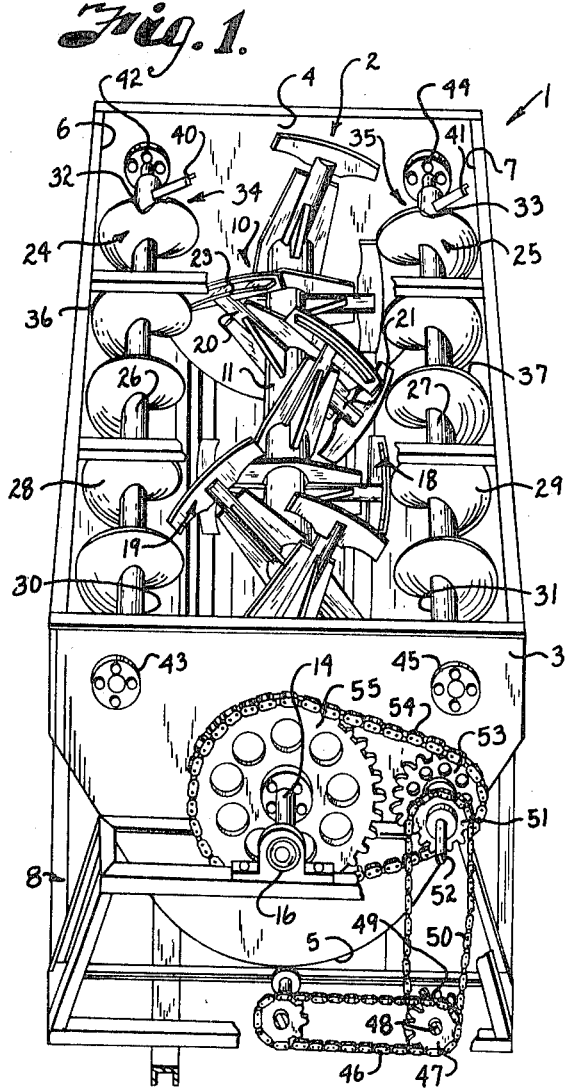
FIG. 1 is a perspective view of a material-mixing apparatus embodying features of the present invention.
Figure 6:
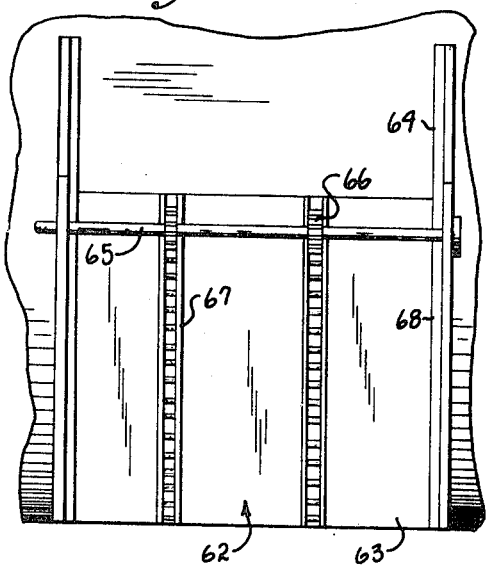
FIG. 6 is an enlarged fragmentary elevational view of an outlet for discharge of mixed materials from the material-mixing apparatus.
Figure 7:
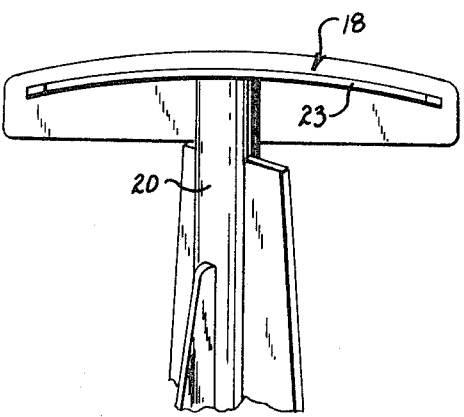
FIG. 7 is an enlarged elevational view of an upwardly and forwardly directed paddle of the agitator.
Figure 8:
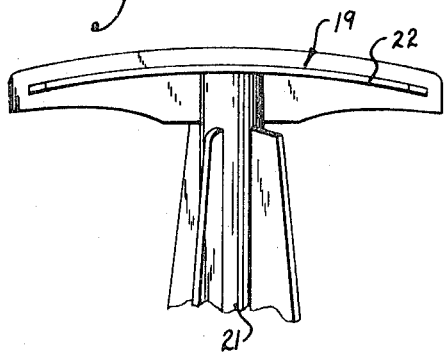
FIG. 8 is an enlarged elevational view, at the same scale as FIG. 7, of a downwardly and rearwardly directed paddle of the agitator.

Referring more in detail to the drawings:

The reference numeral 1 generally designates a material-mixing apparatus operative to thoroughly mix fluent materials, such as various feeds and nutrient materials for animals within a hopper or mixing chamber 2 including a vertically extending forward or front wall 3 and a vertically extending rear wall 4 spaced from and parallel with the front or forward wall. The mixing chamber 2 has a rounded bottom 5 and a pair of opposed sidewalls 6 and 7 extending upwardly therefrom and between the front and rear walls 3 and 4.

The rounded bottom 5 is a transversely curved or arcuate portion and the sidewalls 6 and 7 have lower portions inclining or converging mutually inwardly as they extend downwardly for connection to the rounded bottom 5 which exhibits a partially cylindrical elongated concave surface including an angle of approximately 120°. The sidewalls 6 and 7 each have upper portions extending vertically upwardly from the downwardly and inwardly directed lower portions with the upper or upright portions being spaced laterally of the rounded bottom 5.

The mixing chamber 2 is mounted on a suitable frame 8 preferably formed of lightweight high-strength structural members, such as angles, channels, beams, and the like, secured to the rounded bottom 5 and the sidewalls 6 and 7 to maintain said walls in fixed relative relation thereby producing a substantially rigid structure adapted to be suitably secured on a mobile vehicle (not shown), such as a trailer or truck, without danger of warpage during transportation and operation of the apparatus 1.

An agitator 10 is mounted in a lower portion of the mixing chamber 2 and adjacent the rounded bottom 5. The agitator 10 extends between and is rotatably mounted on the front and rear walls 3 and 4 and the agitator 10 is operative to thoroughly mix fluent materials having different physical characteristics, such as weight, size, viscosity, cohesiveness and the like, to form a thoroughly homogenous feeding ration for farm animals.

The agitator 10 includes an elongated horizontally extending shaft 11 preferably hollow for lightness of weight and having end closures or plugs 12 and 13 rigidly secured in the opposite ends thereof. Shaft extensions 14 and 15 extend from the plugs or end enclosures 12 and 13 respectively and through the front and rear walls 3 and 4 for operative connection to drive means, as later described.

The shaft extensions 14 and 15 are rotatably supported on the front and rear walls 3 and 4 respectively and portions of the frame 8.

In the illustrated structure, suitable supports, such as a pair of spaced, ball-bearing pillow blocks 16 and 17 rotatably support the shaft extensions 14 and 15 respectively with one pillow block 16 being mounted on the front wall 3 and the other pillow block 16 being mounted on a portion of the frame 8 for rotatably supporting the shaft extension 14 and one pillow block 17 being mounted on the rear wall 4 and the other pillow block 17 being mounted on the frame 8 for rotatably supporting the shaft extension 15 and thereby the agitator 10 within the mixing chamber 2 and adjacent the rounded bottom 5.

The agitator 10 is adapted to operate submerged beneath a mass of materials to be mixed and to raise and move a portion of the materials toward the front wall 4 and to move a portion of the materials toward the rounded bottom 5 and the rear wall 4 thereby thoroughly mixing the material within the mixing chamber 2.

In the illustrated structure, the agitator 10 has a plurality of upwardly and forwardly directed paddles 18 and a plurality of downwardly and rearwardly directed paddles 19 to effect a thorough mixing of the materials within the mixing chamber 2. A plurality of arms 20 are mounted on the elongated shaft 11 and extend radially outwardly therefrom and each of the arms 20 has one of the upwardly and forwardly directed paddles secured to the free end thereof. The arms 20 are longitudinally spaced along the elongated shaft 11 and circumferentially spaced thereabout whereby the upwardly and forwardly directed paddles 18 are arranged in a spiral or helical pattern about the elongated shaft 11.

A like plurality of arms 21 are mounted on the elongated shaft 11 in opposed relation with the arms 20 for supporting the downwardly and rearwardly directed paddles 19 on the free ends thereof.

It is desirable to position the upwardly and forwardly directed paddles 18 and the downwardly and rearwardly directed paddles 19 to prevent the mixing action effected by the paddles 18 from being blocked or restricted by the mixing action of the paddles 19 yet have the paddles 19 block a portion of materials moved by the paddles 18 to effect a complete and thorough blending of said materials, therefore, the arms 21 are shorter than the arms 20, such as in the nature of up to 6 inches shorter whereby the downwardly and rearwardly directed paddles 19 each have an outer peripheral edge 22 thereof spaced radially inwardly of an outer peripheral edge 23 of the upwardly and forwardly directed paddles 18. The additional length of the arms 20 provides a minimum clearance between the outer peripheral edges 23 of the paddles 18 and the rounded bottom 5 and adjacent portions of the sidewalls 6 and 7 to thereby raise heavy resistant materials from the bottom of the chamber 2 and effect uniform blending with the entire batch.

The upwardly and forwardly directed paddles 18 each have a surface area in the nature of 140 percent to 160 percent of a surface area of the downwardly and rearwardly directed paddles 19 to effect a positive movement of the materials within the mixing chamber 2 toward the forward or front wall 3 and toward an upper surface of the mass of materials to be mixed.

The upwardly and forwardly directed paddles 18 and the downwardly and rearwardly directed paddles 19 are each disposed at an acute angle with a longitudinal axis of the elongated shaft 11, such as in the nature of 40° to 50° whereby the positioning, relative size, and disposition of the paddles 18 and 19 is effective to thoroughly mix the materials within the mixing chamber 2 when the elongated shaft 11 is rotated.

A pair of side conveyors, such as augers or feed screws 24 and 25, extend between the forward or front wall 3 and the rear wall 4 and have opposite ends rotatably mounted thereon for moving materials adjacent the surface of the mass of materials from the front wall 3 toward the rear wall 4 and toward the agitator 10 to thereby effect a continuous thorough mixing of the materials within the mixing chamber 2. The augers or screw conveyors 24 and 25 are above or upwardly of and laterally spaced from the agitator 10 and adjacent the sidewalls 6 and 7 respectively. The augers or feed screws 24 and 25 include elongated shafts 26 and 27 respectively extending parallel with the elongated shaft 11 of the agitator 10. The augers or screw conveyors 24 and 25 have helical flights 28 and 29 respectively secured to the elongated shafts 26 and 27 with one end 30 and 31 respectively thereof terminating adjacent the front or forward wall 3 and the other ends 32 and 33 of the flights 28 and 29 respectively terminate in spaced relation with the rear wall 4 forming areas 34 and 35 respectively of material direction reversal where the material is delivered to the agitator 10 with the agitator moving the material toward the forward wall 3.

The augers or feed screws 24 and 25 operate partially submerged in the mass of materials to be mixed with edge portions or outer peripheries 36 and 37 of the flights 28 and 29 respectively below an upper surface of the mass of materials whereby rotation of the augers or feed screws 24 and 25 effects movement of the materials along the surface of the mass toward the rear wall 4 and the rear portion of the agitator 10.

Elongated blades 40 and 41 each have one end secured to the elongated shafts 26 and 27 respectively and are positioned between the ends 32 and 33 of the flights 28 and 29 and the rear wall 4 respectively for moving through material adjacent the rear wall 4 and for effectively delivering said materials to the agitator 10 for movement toward the front or forward wall 3.

The elongated shafts 26 and 27 extend through the forward or front wall 3 and the rear wall 4 and are suitably rotatably mounted thereon, such as having the ends of the elongated shaft 26 extending into suitable bearing supports, such as ball-bearing pillow blocks 42 and 43 and the ends of the elongated shaft 27 extending into suitable bearing supports, such as ball-bearing pillow blocks 44 and 45 suitably mounted on exterior surfaces of the walls 3 and 4 respectively.

Rotation of the augers or feed screws 24 and 25 and rotation of the agitator 10 cooperate to continually move the materials within the mixing chamber 2 in a thorough mixing action and circulating the materials to be mixed within the mass of materials wherein the augers or feed screws 24 and 25 circulate the material from the front or forward wall 3 toward the rear wall 4 and toward the agitator 10 which moves the material toward the front or forward wall 3 constantly blending the materials together by operation of the paddles 18 and 19. The augers or feed screws 24 and 25 are rotated in opposite directions for moving the materials toward center of the chamber 2 and toward the agitator 10 which is rotated at a speed faster than each of the screw conveyors. It is also preferable to rotate the augers or feed screws 24 and 25 at different speeds each below the speed of rotation of the agitator 10.

Suitable rotary speeds have been found to be in the nature of 10 to 14 revolutions per minute for one of the screw conveyors, for example, auger or screw conveyor 24, and a rotary speed in the nature of 13 to 17 revolutions per minute for the other screw conveyor 25 and rotation of the agitator 10 at a speed in the nature of 14 to 18 revolutions per minute particularly with the rotation of the auger or screw conveyor 24 being at a slower speed than the rotation of the auger or screw conveyor 25 which also rotates at a slower speed than the agitator 10 thereby effecting a continuous and thorough circulation of the materials within the mixing chamber 2.

Suitable drive means are operatively connected to the agitator 10 and to the screw conveyors or augers 24 and 25 to rotate same and thoroughly blend the mass of materials within the mixing chamber 2 and in the illustrated structure, a suitable prime mover, such as an internal combustion gasoline engine, when the material-mixing apparatus 1 is mounted on a trailer and a power takeoff when the apparatus 1 is mounted on a truck, said prime mover being operative to rotate the elongated shaft 11 by suitable transmission and speed reduction means. For example, the power takeoff is operative to drive a suitable chain 46 engaging a sprocket 47 secured to a shaft 48 which is rotatably mounted on the frame 8. The shaft 48 has a sprocket 49 secured thereon and rotating therewith for forming an input of a speed-reducing system including a sprocket chain 50 engaged with a sprocket wheel 51 secured to a shaft 52 rotatably mounted on the frame 8. A sprocket wheel 53 is secured to the shaft 52 and rotatable therewith and a chain 54 extends between the sprocket 53 and a sprocket 55 secured on the shaft extension 14 of the elongated shaft 11 whereby rotation of the sprocket 55 effects rotation of the agitator 10 and the input speed of the power takeoff is considerably reduced while the input torque is considerably increased.

A sprocket 56 is secured on the shaft extension 15 of the elongated shaft 11 adjacent an exterior surface of the rear wall 4 and a chain 57 engages the sprocket 56 and extends between and engages a sprocket 58 of a portion of the elongated shaft 26 extending exteriorally of the rear wall 4. A second sprocket 59 is secured on the shaft extension 15 and is engaged by a chain 60 extending between and engaging the sprocket 59 and a sprocket 61 secured to a portion of the elongated shaft 27 exteriorally of the rear wall 4. The sprockets 56 and 59 secured to the shaft extension 15 are the same size and have the same number of teeth and the sprockets 58 and 61 secured on the elongated shafts 26 and 27 respectively are different sizes whereby the augers or feed screws 24 and 25 are driven at different speeds and each at a speed slower than that of the agitator 10.

Material is discharged from the mixing chamber 2 through a material discharge opening or port 62 provided in one of the sidewalls, for example sidewall 6, adjacent the rounded bottom 5 and adjacent the forward or front wall 3. An outlet door 63 is slidably retained against the sidewall 6 by means of suitable guide runners 64 and normally closes the discharge port 62, for example, during periods of receiving materials within the mixing chamber 2 and mixing same therein. When it is desired to discharge materials from the mixing chamber 2, the door 63 is opened by any suitable means, such as rotation of a shaft 65 having a plurality of longitudinally spaced gears 66 secured thereon and rotatable therewith and each engageable with a suitable track 67 formed in or secured to an exterior surface of the outlet door 63. The discharge port 62 has a chute 68 surrounding same to guide the materials flowing through the discharge port 63 into a suitable receptacle or conveyor (not shown).

In operation of a material-mixing apparatus constructed as illustrated and described, the material to be mixed is dumped into the hopper or mixing chamber 2 and the prime mover is started to rotate the agitator 10 and the augers or feed screws 24 and 25 at the relative speeds previously described. The agitator 10 is rotated to move the paddles 18 and 19 in circumferential paths around the shaft 11 whereby the upwardly and forwardly directed paddles 18 raise and lower the material while moving same toward the forward or front wall 3 and the downwardly and rearwardly directed paddles 19 raise and lower the material while moving same toward the rear wall 4 with the overall movement effected by the agitator 10 being toward the front or forward wall 3. The material resting adjacent the augers or screw conveyors 24 and 25 is urged toward the rear wall 4 and tends to accumulate in the areas 34 and 35. The blades 40 and 41 prevent the material from packing against the rear wall 4 and generally tend to keep the mass constantly in motion. The agitator 10 operating at a speed faster than each of the augers or feed screws 24 and 25 tends to pull a volume of material equal to that delivered by the augers or feed screws 24 and 25 toward the forward or front wall 3. The relative motion of the streams of material with portions moving toward the rear wall 4 and portions simultaneously moving toward the forward or front wall 3 creates crosscurrents and eddies within the material which tends to produce a thorough and complete intermixing thereof.

The materials below the screw conveyors 24 and 25 and laterally of the agitator 10 are moved by gravity into voids within the mass of materials created by movement of the paddles 18 and 19 through the mass of materials to fill said voids. As the material is drawn or moved toward the forward or front wall 3 by the agitator 10, it reaches an area wherein the outer peripheries or edge portions 36 and 37 of the flights of the augers or screw conveyors 24 and 25 tend to urge the material in the opposite direction wherein the material is urged upwardly and downwardly the the rotation of the upwardly and forwardly directed paddles 18 thereby creating flow disturbances of substantially high turbulence wherein the material is crowded or forced upwardly into contact with the outer peripheries or edge portions 36 and 37 of the augers or feed screws 24 and 25 which urge the material toward the rear wall 4 to repeat the mixing cycle.

The material is moved toward the forward or front wall 3 by the agitator 10 and the material below the surface is thoroughly mixed and thus, this makes an ideal location for the discharge opening or port 62 through which the mixed material may be discharged. It is noted that due to the direction of rotation of the augers or screw conveyors 24 and 25, there is no tendency for material to pack against the forward wall 3 and any tendency of the material to pack at the rear wall 4 is thwarted by the action of the elongated blades 40 and 41.

The material mixing apparatus 1 has been found to operate efficiently with either small or large quantities of materials to be mixed. A load which is so small as to not reach the levels of the side augers or feed screws 24 and 25 is effectively intermixed by operation of the paddles 18 and 19 during rotation of the agitator 10.

It is to be understood that while I have illustrated and described one form of my invention, it is not to be limited to the specific form or arrangement of parts herein described and shown.

What I claim and desire to secure by Letters Patent is:
1. A material-mixing apparatus comprising:
 a. a mixing chamber adapted to contain materials to be mixed, said mixing chamber being defined by a rounded bottom and opposed sidewalls extending upwardly therefrom and and spaced front and rear walls connected with said bottom and sidewalls;
 b. an agitator in the mixing chamber and adapted to operate submerged beneath a mass of materials to be mixed, said agitator being rotatably mounted adjacent said rounded bottom and having a plurality of upwardly and forwardly directed paddles and a plurality of downwardly and rearwardly directed paddles;
 c. a screw conveyor adjacent each of said sidewalls, said screw conveyors each being positioned at a higher level than said agitator and having edge portions of a flight thereof below an upper surface of the mass of materials; and
 d. drive means operatively connected to said agitator and to each of said screw conveyors to rotate same and blend said mass of materials.

2. A material-mixing apparatus as set forth in claim 1 wherein said upwardly and forwardly directed paddles each have a surface area in the nature of 140 to 160 percent of a surface area of said downwardly and rearwardly directed paddles.

3. A material-mixing apparatus as set forth in claim 2 wherein:
 a. said screw conveyors are rotated in opposite directions for moving the materials toward said agitator; and
 b. said agitator is rotated at a speed faster than each of said screw conveyors.

4. A material-mixing apparatus as set forth in claim 3 wherein:
 a. said upwardly and forwardly directed paddles each have a surface area in the nature of 140 to 160 percent of a surface area of said downwardly and rearwardly directed paddles;
 b. said downwardly and rearwardly directed paddles each have an outer peripheral edge thereof spaced radially inwardly of outer peripheral edges of said upwardly and forwardly directed paddles;
 c. said agitator has an elongated shaft with said first plurality of paddles and said second plurality of paddles longitudinally spaced therealong with said upwardly and forwardly directed paddles being arranged in a helical pattern about said shaft; and
 d. said downwardly and rearwardly directed paddles each have an outer peripheral edge thereof spaced radially inwardly of outer peripheral edges of said upwardly and forwardly directed paddles.

5. A material-mixing apparatus as set forth in claim 4 wherein:
 a. one of said screw conveyors is rotated at a speed in the nature of 10 to 14 revolutions per minute;
 b. the other of said screw conveyors is rotated at a speed in the nature of 13 to 17 revolutions per minute; and
 c. said agitator is rotated at a speed in the nature of 14 to 18 revolutions per minute.

6. A material-mixing apparatus as set forth in claim 1 wherein said agitator includes:
a. an elongated shaft having opposite ends thereof rotatably mounted on said end walls;
b. a first plurality of arms extending outwardly from said elongated shaft and each having one of said upwardly and forwardly directed paddles secured to a free end thereof; and
c. a second plurality of arms extending outwardly from said elongated shaft and each having one of said downwardly and rearwardly directed paddles secured to a free end thereof, said downwardly and rearwardly directed paddles each having an outer peripheral edge thereof spaced radially inwardly of outer peripheral edges of said upwardly and forwardly directed paddles.

7. A material-mixing apparatus as set forth in claim 6 wherein:
a. said upwardly and forwardly directed paddles are disposed at an acute angle with a longitudinal axis of said elongated shaft whereby rotation of said upwardly and forwardly directed paddles is effective to raise and move a portion of said materials toward the front end wall; and
b. said downwardly and rearwardly directed paddles are disposed at an acute angle with a longitudinal axis of said elongated shaft whereby rotation of said downwardly and rearwardly directed paddles is effective to move a portion of said materials toward the rounded bottom and the rear end wall.

8. A material-mixing apparatus as set forth in claim 1 wherein said agitator has an elongated shaft with said first plurality of paddles and said second plurality of paddles longitudinally spaced therealong and said upwardly and forwardly directed paddles are arranged in a helical pattern about said shaft.

9. A material-mixing apparatus as set forth in claim 1 wherein said downwardly and rearwardly directed paddles each have an outer peripheral edge thereof spaced radially inwardly of outer peripheral edges of said upwardly and forwardly directed paddles.

10. A material-mixing apparatus as set forth in claim 1 wherein:
a. said upwardly and forwardly directed paddles each have a surface area in the nature of 140 to 160 percent of a surface area of said downwardly and rearwardly directed paddles; and
b. said downwardly and rearwardly directed paddles each have an outer peripheral edge thereof spaced radially inwardly of outer peripheral edges of said upwardly and forwardly directed paddles.

11. A material-mixing apparatus comprising:
a. a mixing chamber adapted to contain materials to be mixed, said mixing chamber being defined by a rounded bottom and opposed sidewalls extending upwardly therefrom and spaced front and rear end walls connected with said bottom and sidewalls;
b. an agitator in the mixing chamber and adapted to operate submerged beneath a mass of materials to be mixed, said agitator being rotatably mounted adjacent said rounded bottom and having an elongated shaft and a first plurality of upwardly and forwardly directed paddles and a second plurality of downwardly and rearwardly directed paddles mounted on said shaft and longitudinally spaced therealong, said upwardly and forwardly directed paddles each having a surface area in the nature of 140 to 160 percent of a surface area of said downwardly and rearwardly directed paddles, said upwardly and forwardly directed paddles being arranged in a helical pattern about said elongated shaft;
c. a screw conveyor adjacent each of said sidewalls, said screw conveyors each being positioned above said agitator and having edge portions of a flight thereof below an upper surface of the mass of materials, said screw conveyors being rotated in opposite directions for moving the materials toward said agitator; and
d. drive means operatively connected to said agitator and to each of said screw conveyors to rotate same and blend said mass of materials, said drive means being operative to rotate said agitator at a speed faster than each of said screw conveyors.

* * * * *